US008378061B2

(12) United States Patent
Drysdale et al.

(10) Patent No.: US 8,378,061 B2
(45) Date of Patent: *Feb. 19, 2013

(54) POLYESTER FILMS WITH IMPROVED OIL REPELLENCY

(75) Inventors: Neville Everton Drysdale, Newark, DE (US); Surbhi Mahajan, Newark, DE (US); Kenneth Gene Moloy, Hockessin, DE (US); Fredrik Nederberg, Greenville, DE (US); Joel M. Pollino, Elkton, MD (US); Joachim C. Ritter, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/873,402

(22) Filed: Sep. 1, 2010

(65) Prior Publication Data

US 2011/0218316 A1  Sep. 8, 2011

Related U.S. Application Data

(60) Provisional application No. 61/239,100, filed on Sep. 2, 2009.

(51) Int. Cl.
  *C08G 73/24* (2006.01)
(52) U.S. Cl. ........ 528/401; 528/299; 528/370; 528/372; 528/397; 428/40.1; 428/40.6; 428/40.7; 428/411.1; 428/421; 428/422; 564/134; 570/101; 570/123; 570/126; 570/138; 525/276
(58) Field of Classification Search .................. 528/271, 528/272, 299, 370, 372, 397, 401; 525/50, 525/276; 570/101, 122, 123, 124, 135, 126; 570/127, 129, 130, 131, 136, 138, 163, 257; 562/400, 405, 465, 470, 472, 475, 481, 840, 562/855, 856, 860, 861; 560/1, 8, 47, 54, 560/55, 60, 62, 63, 100, 111; 428/40.1, 40.6, 428/40.7, 411.1, 421, 422; 564/134
See application file for complete search history.

(56) References Cited

U.S. PATENT DOCUMENTS

| 4,219,625 | A | 8/1980 | Mares et al. |
| 4,841,093 | A | 6/1989 | Tamaru et al. |
| 5,091,456 | A | 2/1992 | Rodini |
| 5,104,961 | A | 4/1992 | Muller |
| 5,243,019 | A | 9/1993 | Takeda et al. |
| 5,349,093 | A | 9/1994 | Oka et al. |
| 5,468,882 | A | 11/1995 | Schohe-Loop et al. |
| 5,756,814 | A | 5/1998 | Lin et al. |
| 6,734,227 | B2 | 5/2004 | Jing et al. |
| 6,790,898 | B2 | 9/2004 | Lee et al. |
| 6,960,642 | B2 | 11/2005 | Jariwala et al. |
| 7,202,324 | B2 | 4/2007 | Kim et al. |
| 7,446,127 | B2 | 11/2008 | Choi et al. |
| 7,825,280 | B2 | 11/2010 | Saegusa et al. |

| 2002/0042526 | A1 | 4/2002 | Piscopio et al. |
| 2003/0001130 | A1 | 1/2003 | Qiu |
| 2004/0235685 | A1 | 11/2004 | Russo et al. |
| 2008/0020148 | A1 | 1/2008 | Klein et al. |
| 2008/0039558 | A1 | 2/2008 | Lazzari et al. |

FOREIGN PATENT DOCUMENTS

| EP | 1616849 | A2 | 1/2006 |
| JP | 62197419 | A | 9/1987 |
| JP | 62205181 | A | 9/1987 |
| JP | 1249747 | A | 11/1989 |
| JP | 5294903 | A | 11/1993 |
| JP | 1017522 | A | 1/1998 |
| JP | 2005120001 | A | 5/2005 |
| KR | 1020030046554 | A | 6/2003 |
| KR | 1020040006591 | A | 1/2004 |
| WO | 9967304 | A1 | 12/1999 |
| WO | 2006043501 | A1 | 4/2006 |

OTHER PUBLICATIONS

International Search Report, Related PCT International Application No. PCT/US2010/047472 Mailed May 30, 2011 (Neville Everton Drysdale, Filed Sep. 1, 2010).
International Search Report, Related PCT International Application No. PCT/US2010/047514 Mailed May 18, 2011 (Neville Everton Drysdale et al., Filed Sep. 1, 2010).
Related PCT International Application No. PCT/US2010/049962 (Neville Everton Drysdale, Filed Sep. 23, 2010).
International Search Report, Related PCT International Application No. PCT/US2010/047473 Mailed Mar. 17, 2011 (Neville Everton Drysdale et al., Filed Sep. 1, 2010).
International Search Report, Related PCT International Application No. PCT/US2010/047492 Mailed May 31, 2011 (Neville Everton Drysdale et al., Filed Sep. 1, 2010).
JP2005-120001, Machine Translation, Thomson Innovation (www.thomsoninnovation.com, Sep. 26, 2011).
JP62-197491A, Machine Translation of Abstract Only (www.worldwide.espacenet.com, Sep. 26, 2011).
JP62-205181A, Machine Translation of Abstract Only (www.worldwide.espacenet.com, Sep. 26, 2011).
JP12-49747, Machine Translation of Abstract Only (www.worldwide.espacenet.com, Sep. 26, 2011).
JP52-94903A, Machine Translation of Abstract Only (www.worldwide.espacenet.com, Sep. 26, 2011).
Co-pending U.S. Appl. No. 12/873,392, Neville Everton Drysdale, filed Sep. 1, 2010.
Co-pending U.S. Appl. No. 12/873,396, Neville Everton Drysdale, filed Sep. 1, 2010.
Co-pending U.S. Appl. No. 12/873,418, Neville Everton Drysdale, filed Sep. 1, 2010.
Co-pending U.S. Appl. No. 12/873,423, Neville Everton Drysdale, filed Sep. 1, 2010.
Co-pending U.S. Appl. No. 12/873,428, Neville Everton Drysdale, filed Sep. 1, 2010.
Feiring, A.E. et al., Aromatic Monomers with Pendant Fluoroalkylsulfonate and Sulfonimide Groups, Journal of Fluorine Chemistry 105(2000), pp. 129-135.
ASTM International, Designation: E29-08, Standard Practice for Using Significant Digits in Test Data to Determine Conformance with Specifications, pp. 1-5, 2008.

*Primary Examiner* — James J Seidleck
*Assistant Examiner* — Frances Tischler (57) ABSTRACT

Provided are films made from copolyesters having improved oil repellency as compared to conventional copolyesters. The copolyesters are derived from certain perfluorinated monomers.

1 Claim, 5 Drawing Sheets

POLYESTER FILMS WITH IMPROVED OIL REPELLENCY

FIELD OF THE INVENTION

The present invention is directed to films made from copolyesters derived from perfluorinated monomers. The polyester films exhibit improved oil repellency.

BACKGROUND

Fluorinated materials have many uses. In particular, they are used in the in polymer-related industries, and, more particularly, in fiber-related industries, to impart soil and oil resistance. Generally, these materials are applied as a topical treatment, but their effectiveness decreases over time due to material loss via wear and washing.

There is a need to provide polymeric materials that have improved soil and oil resistance in general, as well as over time. By incorporating fluorinated aromatic diesters into polymer backbones, more permanent soil and oil resistance can be achieved.

SUMMARY OF THE INVENTION

One aspect of the present invention is a film formed from a copolyester comprising a perfluorinated monomer, wherein the amount of the perfluorinated monomer is from about 0 to 100 wt % of the copolyester, and wherein the film formed from the copolyester exhibits a hexane contact angle exceeding 60 degrees, and a water contact angle exceeding 110 degrees.

The copolyesters can be represented by formula I, II or II:

wherein, for (I) and (II),
each R is independently H, $C_1$-$C_{10}$ alkyl, $C_5$-$C_{15}$ aryl, or $C_6$-$C_{20}$ arylalkyl;
each $R^1$ is independently $C_1$-$C_{10}$ alkyl, $C_5$-$C_{15}$ aryl, or $C_6$-$C_{20}$ arylalkyl;
each X is independently O or $CF_2$;
each Y is independently O or $CF_2$;
each Z is independently Cl or Br;
each $Rf^1$ is independently $(CF_2)_n$, wherein each n is independently 0-10;
each $Rf^2$ is independently $(CF_2)_p$, wherein each p is independently 0-10,
with the proviso that when p is 0, Y is $CF_2$;
each q is independently 0-10;
m is 1-10,000; and
w is 1-10,000;
and wherein, for (III),
each R is independently H, $C_1$-$C_{10}$ alkyl, $C_5$-$C_{15}$ aryl, or $C_6$-$C_{20}$ arylalkyl;
each $R^1$ is independently $C_1$-$C_{10}$ alkyl, $C_5$-$C_{15}$ aryl, or $C_6$-$C_{20}$ arylalkyl;
each X is independently O or $CF_2$;
each Y is independently O or $CF_2$;
each Z is independently H, Cl or Br, with the proviso that only one Z can be H; and
each $Rf^1$ is independently $(CF_2)_n$, wherein each n is independently
0-10 each $Rf^2$ is independently $(CF_2)_p$, wherein each p is independently 0-10,
with the proviso that when p is 0, Y is $CF_2$;
each q is independently 0-10;
m is 1-10,000; and
w is 1-10,000.

DETAILED DESCRIPTION

The novel copolyesters disclosed herein have been found to exhibit properties that make them desirable for a variety of end-uses, including films and molded articles, as well as fibers and materials constructed from the fibers. The copolyesters contain, as polymerized units, 1,1,2-trifluoro aromatic esters, which are optionally halogenated, e.g., 2-halo-1,1,2-trifluoro aromatic esters. The copolyesters are also well suited for fiber spinning.

The fluorinated aromatic diesters are made by adding a hydroxy aromatic diester to a perfluorinated vinyl compound, such as a perfluorinated vinyl ether, in the presence of a solvent (optionally halogenated) and a catalyst.

While any hydroxy aromatic diester can be used, 1,4-dimethyl-2-hydroxy terephthalate, 1,4-diethyl-2-5-dihydroxy terephthalate, 2-hydroxy-1,4-dimethoxy terephthalate, dimethyl 5-hydroxyisophthalate, dimethyl 4-hydroxyisophthalate, dimethyl 4,6-dihydroxyisophthalate, dimethyl 2-hydroxyisophthalate, dimethyl 2,5-dihydroxyisophthalate, dimethyl 2,4-dihydroxyisophthalate, dimethyl 2,3-dihydroxyisophthalate, dimethyl 3-hydroxyphthalate, dimethyl 4-hydroxyphthalate, dimethyl 3,4-dihydroxyphthalate, dimethyl 4,5-dihydroxyphthalate, dimethyl 3,6-dihydroxyphthalate, dimethyl 4,8-dihydroxynaphthalene-1,5-dicarboxylate, dimethyl 3,7-dihydroxynaphthalene-1,5-dicarboxylate, and dimethyl 2,6-dihydroxynaphthalene-1,5-dicarboxylate are particularly useful.

A variety of perfluorinated vinyl compounds can be used in the syntheses disclosed herein, such as, for example, 1,1,1,2,2,3,3-heptafluoro-3-(1,1,1,2,3,3-hexafluoro-3-(1,2,2-trifluorovinyloxy)propan-2-yloxy)propane, heptafluoropropyl-trifluorovinylether, perfluoroethene, perfluoroprop-1-ene, perfluorobut-1-ene, perfluoropent-1-ene, perfluorohex-1-ene, perfluorohept-1-ene, perfluorooct-1-ene, perfluoronon-1-ene, and perfluorodec-1-ene.

Generally, the hydroxy aromatic diesters and perfluorinated vinyl compounds as disclosed above are mixed in the presence of a halogenated solvent, such as, for example, tetrachloromethane, tetrabromomethane, hexachloroethane and hexabromoethane.

The reaction disclosed herein is catalyzed by a base. A variety of basic catalysts can be used, i.e., any catalyst that is capable of deprotonating phenol. Non-limiting examples include sodium methoxide, calcium hydride, sodium metal, potassium methoxide, and potassium t-butoxide. Of particular use is potassium t-butoxide.

The hydroxyl aromatic diester and perfluorinated vinyl compound are mixed in the presence of a solvent and a catalyst until the reaction is complete. Generally, the reaction is run at temperatures within the range of about −70° C. to the reflux temperature of the reaction mixture, preferably from about room temperature (25° C.) to the reflux temperature of the reaction mixture. The reaction mixture can be held at reflux temperature until the desired progress of reaction is achieved. The time of the reaction varies on the reaction temperature and reaction mixture components, and is easily determined by the skilled artisan using a variety of techniques, including, but not limited to, nuclear magnetic resonance spectroscopy, thin layer chromatography, and gas chromatography. Then, the reaction mixture is quenched, optionally with acid (e.g., 10% HCl) and, after concentrating under vacuum, rinsed with a solvent (e.g., dichloromethane). More than one perfluorinated aromatic diester can be made in the reaction mixture, which can then be isolated by any method known to the skilled artisan, including by distillation or column chromatography.

The resulting 2-halo-1,1,2-trifluoro aromatic esters may be represented by one of the following formulas:

wherein, for (A) and (B), each R is independently H, $C_1$-$C_{10}$ alkyl, $C_5$-$C_{15}$ aryl, or $C_6$-$C_{20}$ arylalkyl;

each $R^1$ is independently $C_1$-$C_{10}$ alkyl, $C_5$-$C_{15}$ aryl, or $C_6$-$C_{20}$ arylalkyl;

each X is independently O or $CF_2$;

each Y is independently O or $CF_2$;

each Z is independently H, Cl or Br;

each $Rf^1$ is independently $(CF_2)_n$, wherein each n is independently 0-10;

each $Rf^2$ is independently $(CF_2)_p$, wherein each p is independently 0-10, with the proviso that when p is 0, Y is $CF_2$;

and each q is independently 0-10;

and wherein, for (C), each R is independently H, $C_1$-$C_{10}$ alkyl, $C_5$-$C_{15}$ aryl, or $C_6$-$C_{20}$ arylalkyl;

each $R^1$ is independently $C_1$-$C_{10}$ alkyl, $C_5$-$C_{15}$ aryl, or $C_6$-$C_{20}$ arylalkyl;

each X is independently O or $CF_2$;

each Y is independently O or $CF_2$;

each Z is independently H, Cl or Br, with the proviso that only one Z can be H;

each $Rf^1$ is independently $(CF_2)_n$, wherein each n is independently 0-10; each $Rf^2$ is independently $(CF_2)_p$, wherein each p is independently 0-10, with the proviso that when p is 0, Y is $CF_2$; and each q is independently 0-10.

As can be noted in the formulas above, the substituents can be attached to the benzene ring at any point, thus making it possible to have ortho-, meta- and para-substituents as defined above.

To make copolyesters comprising perfluorinated ether aromatic diesters, other aromatic diesters, including aromatic dicarboxylic acids and their dimethyl esters, are added to the reaction. One particularly useful diester that can be added is dimethyl terephthalate. Some non-limiting, representative aromatic dicarboxylic acids are isophthalic acid, terephthalic acid, 2,6-naphthalene dicarboxylic acid, 4,4'-sulfonyldibenzoic acid, 4-sulfophthalic acid and biphenyl-4,4'-dicarboxylic acid. The diester version of these dicarboxylic acids can also be synthesized, for example by adding the dicarboxylic acids to a glycol (e.g., 1,3-propanediol) in the presence of a catalyst. Generally, titanium (IV) based transesterification catalysts (for example titanium (IV) butoxide and titanium (IV) isopropoxide) are used in the reaction, although other catalysts also can be used (for example antimony, zinc, and tin based catalysts). The mixture is stirred and reacted at elevated temperatures until the reaction is complete, and then the polyester formed is optionally isolated by means known to the skilled artisan, e.g., vacuum distillation, precipitation, or disassembling the vessel.

When a copolyester comprising 1,1,2-trifluoro(perfluorinated ether)ethoxy diester is produced, the product can be represented by the one of the following general formulas:

-continued wherein, for (I) and (II),
each R is independently H, $C_1$-$C_{10}$ alkyl, $C_5$-$C_{15}$ aryl, or $C_6$-$C_{20}$ arylalkyl;
each $R^1$ is independently $C_1$-$C_{10}$ alkyl, $C_5$-$C_{15}$ aryl, or $C_6$-$C_{20}$ arylalkyl;
each X is independently O or $CF_2$;
each Y is independently O or $CF_2$;
each Z is independently H, Cl or Br;
each $Rf^1$ is independently $(CF_2)_n$, wherein each n is independently 0-10;
each $Rf^2$ is independently $(CF_2)_p$, wherein each p is independently 0-10,
with the proviso that when p is 0, Y is $CF_2$;
each q is independently 0-10;
m is 1-10,000; and
w is 1-10,000;
and wherein, for (III),
each R is independently H, $C_1$-$C_{10}$ alkyl, $C_5$-$C_{15}$ aryl, or $C_6$-$C_{20}$ arylalkyl;
each $R^1$ is independently $C_1$-$C_{10}$ alkyl, $C_5$-$C_{15}$ aryl, or $C_6$-$C_{20}$ arylalkyl;
each X is independently O or $CF_2$;
each Y is independently O or $CF_2$;
each Z is independently H, Cl or Br, with the proviso that only one Z can be H;
each $Rf^1$ is independently $(CF_2)_n$, wherein each n is independently 0-10; each $Rf^2$ is independently $(CF_2)_p$, wherein each p is independently 0-10,
with the proviso that when p is 0, Y is $CF_2$;
each q is independently 0-10;
m is 1-10,000; and
w is 1-10,000.

Copolyesters can be formed by combining a perfluorinated aromatic dicarboxylic acid, a second aromatic dicarboxylic acid and a glycol, in a manner similar to that disclosed above.

As can be noted in the formulas above, the substituents can be attached to the benzene ring at any point, thus making it possible to have ortho-, meta- and para-substituents as defined above.

The 1,3-propanediol employed for preparing the materials disclosed herein may be obtained by any of the various well known chemical routes or by biochemical transformation routes. Preferred routes are disclosed in, for example, US20050069997A1.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been disclosed that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes disclosed and referenced above, contains carbon from the atmospheric carbon dioxide incorporated by plants, which compose the feedstock for the production of the 1,3-propanediol. The biologically-derived 1,3-propanediol preferred for use in the processes disclosed herein contains only renewable carbon, and not fossil fuel-based or petroleum-based carbon. The PO3G derived from the biological 1,3-propanediol, therefore, has less impact on the environment as the 1,3-propane diol used in the compositions does not deplete diminishing fossil fuels and, upon degradation, releases carbon back to the atmosphere for use by plants once again. Thus, in some embodiments, the compositions disclosed herein can be characterized as more natural and having less environmental impact than similar compositions containing petroleum based glycols.

As disclosed herein, modifications can be made to the polyester backbone via synthetic routes to make the polymer inherently lipophobic or to provide enhanced hydrophobicity. More specifically, copolymers of dimethylterephtalate (DMT), perfluoroether dimethyl terephthalate, or perfluoroether dimethyl isophthalate with 1,3-propanediol (PDO) have been made and used to form copolymers. Generally, two different perfluoroether side chain lengths can be incorporated resulting in either 10 or 16 fluorine atoms per repeat unit.

The copolymers can be successfully synthesized using the fluorinated dimethyl/diacid terephthalate, or dimethyl/diacid isophthalate at various concentrations relative that of DMT/TPA, using, for example, TYZOR® titanium tetraisopropoxide as catalyst.

The corresponding copolymer structures can be characterized by spectroscopy ($^1$H-NMR, $^{19}$F-NMR) and thermal analysis, which generally reveals only modest perturbations of melting, and glass transition temperatures as compared with that of neat poly(trimethylene) terephthalate. Typically, copolyesters having intrinsic viscosities (IV) of about 0.9-1.0 are obtained.

The copolymers can be used to form films or sheets, using methods known to those skilled in the art for forming films from thermoplastic polymers. Typically, the term "sheet" is used for such articles having a thickness of about 250 microns or greater, and the term "film" is used for articles having a thickness less than about 250 microns. Methods for forming films fall generally into three broad categories: solution casting (suitable for making coatings), melt casting and compression molding.

Solution casting is typically used for polymers that cannot be melt-extruded or that are extremely heat-sensitive, but can be used for a variety of polymers including copolyesters such as those disclosed herein. In solution casting of films, the polymer is dissolved in a solvent, optionally along with additives such as antioxidants, flame retardants, and/or pigments. Typically, a homogeneous polymer solution is filtered and degassed, followed by formation and drying of a gel film. The solution can then be deposited onto a surface. The gel films are formed from the solutions by evaporation and coagulation. Examples of suitable surfaces are metal, glass, or another polymer, depending on the adhesive properties of the surface and the desired end use. After casting, solvent can be removed from the film by, for example, heating. The film can be left on the surface, or peeled off to form a free-standing film, depending upon the intended end use. The rate of drying of the gel films into self-supporting films depends in part on the rate of diffusion of the solvent; thus, solution casting is most suitable for relatively thin films. The characteristics of solution cast films include low residual orientation, uniform properties in all directions, and smooth surfaces.

Melt casting is typically used to form a continuous film from a molten polymer. Polymer, typically in the form of pellets, flakes, or powder, is fed to a melt extruder (single screw or twin screw), in which the polymer is melted to form a continuous molten stream, which is then fed, under pressure generated by continuous rotation of the screw, to a film die. The die is of a selected thickness, generally about 25 to 100 microns but can be much thinner, e.g., about 10 microns. Optional additives, as recited above, can be co-fed into the extruder with the polymer. The width of the film can vary, e.g, as narrow as about 25 cm or as wide as 6 feet in a commercial operation. Alternatively, the die can form the film into a continuous hollow cylinder, which can be up to several feet in diameter. Processing conditions affect the properties of the film. Depending on the polymer, the rate of heat removal from the film determines the extent and morphology of crystallinity of the film and the degree of residual orientation. Another factor influencing the film properties is the temperature at which heat is removed from the film. If a high quality surface or a uniform heat-transfer rate is required, a pinning step can be used. Pinning is defined as the forcible application of the molten film to the casting surface. Pinning cam be carried out by an air knife, a vacuum box, a nip roll, or a strong electrostatic field. Pinning can permit high production rates while maintaining uniform properties across the film. The pinning force prevents air from being trapped between the film and the casting surface. Choice of pinning method depends upon the speed of the operation and the quality of the film.

Compression molding is typically carried out on a relatively small scale, e.g., laboratory rather than commercial scale. Molten polymer is placed into a frame of desired length, width and thickness (e.g., 4 inches×4 inches×150 microns thick), then subject to heating and pressure using, for example, a hydraulic press. After sufficient time for the polymer to fill the frame and then cool, the film can be removed from the frame and subjected to testing.

Figure 1A:
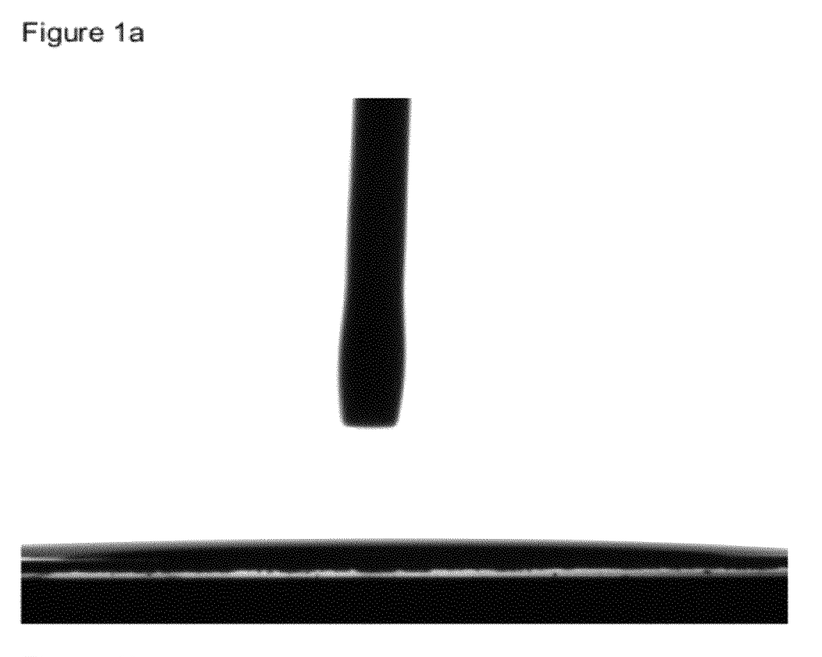
FIG. 1a is a photographic representation of a bead of hexane on the surface of a poly(trimethylene)terephthalate homopolymer.
Figure 2A:
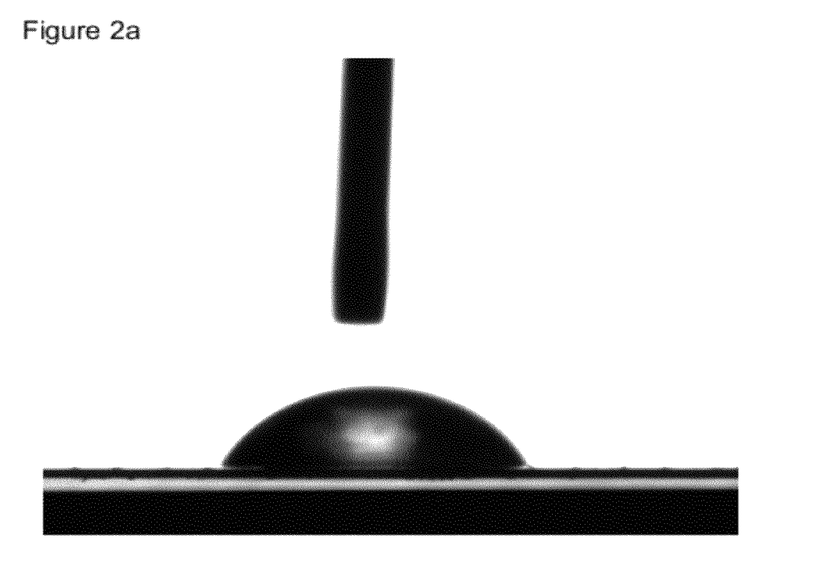
FIG. 2a is a photographic representation of a bead of hexane on the surface of a copolymer of poly(trimethylene) terephthalate and a perfluorinated monomer.
Figure 3A:
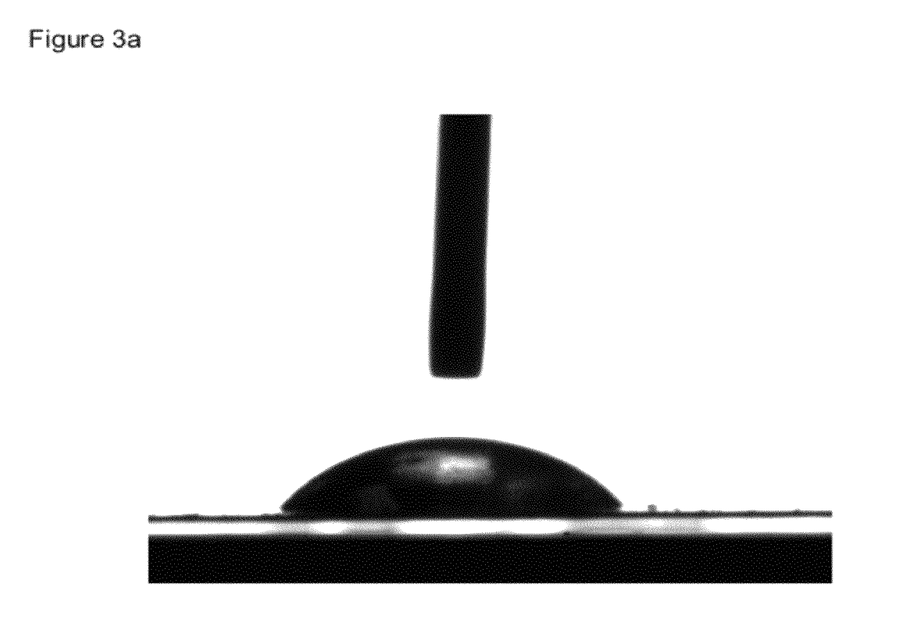
FIG. 3a is a photographic representation of a bead of hexane on the surface of a copolymer of poly(trimethylene) terephthalate and a perfluorinated monomer.
Figure 3B:
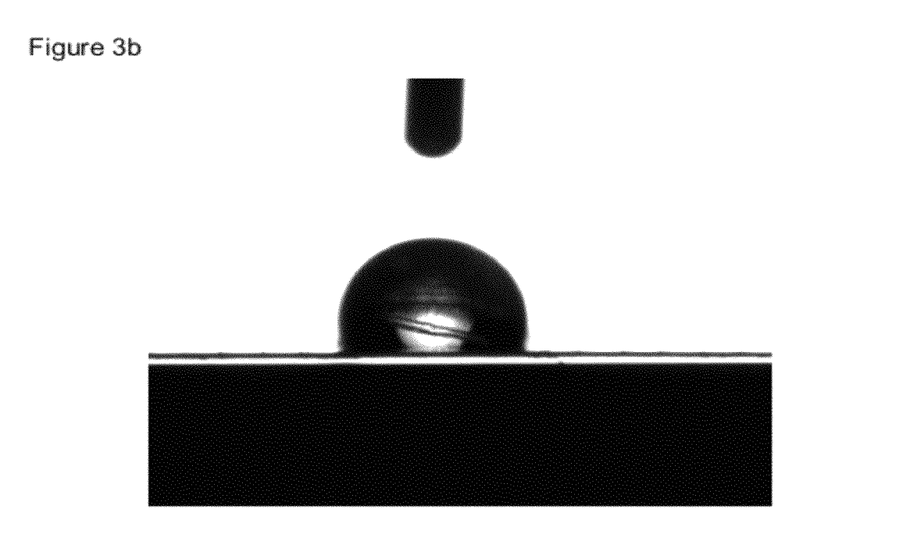
FIG. 3b is a photographic representation of a bead of water on the surface of a copolymer of poly(trimethylene)terephthalate and a perfluorinated monomer.
Figure 4A:
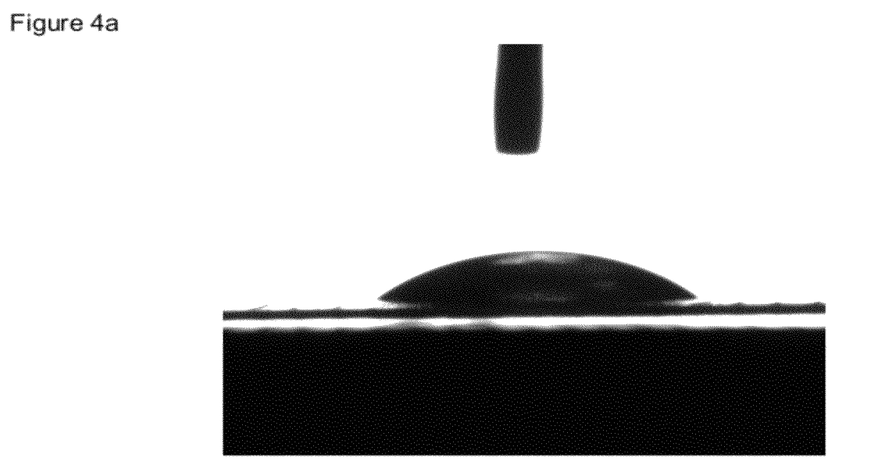
FIG. 4a is a photographic representation of a bead of hexane on the surface of a copolymer of poly(trimethylene) terephthalate and a perfluorinated monomer.
Figure 4B:
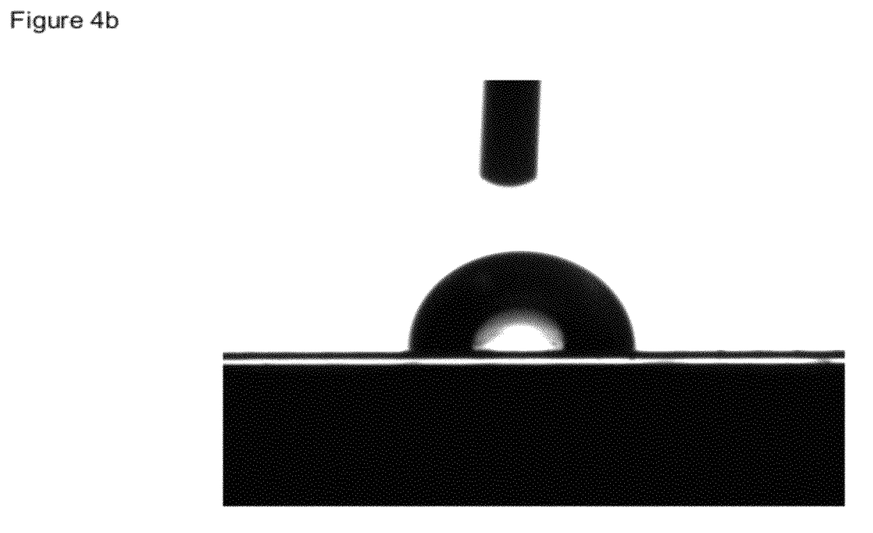
FIG. 4b is a photographic representation of a bead of water on the surface of a copolymer of poly(trimethylene)terephthalate and a perfluorinated monomer.

The incorporation of fluorine has been shown to significantly lower the overall surface energy of resulting copolymers. Melt pressed and spun samples have shown that the fluorinated low energy component will enrich the air-solid interphase which results in increased repellency of both water and oil as compared with neat polyesters (typically, poly (trimethylene terephthalate). Typically, neat poly(trimethylene terephthalate) completely wets a droplet of hexadecane ($C_{16}$-lipid) and exhibits a water contact angle exceeding 60°. The polyester comprising one or more perfluorinated monomer, e.g., $F_{16}$-iso-perfluoroether-poly(trimethylene terephthalate) based copolymer with an overall loading of perfluorinated monomer of 10 wt % relative to dimethyl terephthalate possessed a hexadecane contact angle exceeding 60°, and a water contact angle exceeding 110°, as shown in FIGS. 1a and 2a. The hexadecane droplet in addition completely dewetted when being removed, thus demonstrating the lipophobicity of this novel surface. Film made from the polyester comprising one or more perfluorinated monomer, e.g., $F_{16}$-para-perfluoroether-poly(trimethylene terephthalate) based copolymer with an overall loading of perfluorinated monomer of 10 wt % relative to dimethyl terephthalate possessed a hexadecane contact angle exceeding 50°, and a water contact angle exceeding 105°, as shown in FIG. 3. Film made from the polyester comprising one or more perfluorinated monomer, e.g., $F_{10}$-iso-perfluoroether-poly(trimethylene terephthalate) based copolymer with an overall loading of perfluorinated monomer of 10 wt % relative to dimethyl terephthalate possessed a hexadecane contact angle exceeding 35°, and a water contact angle exceeding 90°, as shown in FIG. 4.

ESCA/XPS was measured at the surface at an angle of 45°, total sampling depth ~50 Å, and confirms that fluorine is on the outermost surface and also that the concentration is higher as compared with the general bulk composition, as shown in the Examples and Tables 1-3 below.

Therefore, the addition of perfluorinated monomers to poly (trimethylene terephthalate), even with only modest fluorine content, have been shown to significantly improve the repellency of oil, and in addition enhance the hydrophobicity, of the resulting copolymer.

Static contact angles were recorded on a Rame'-Hart Instrument Co. goniometer Rame'-Hart Model 100-25-A instrument with an integrated DROPimage Advanced v2.3 software system. A micro syringe dispensing system was used for either water or hexadecane and a volume of 4 μL of the dispensing liquid was used.

Electron Spectroscopy for Chemical Analysis (ESCA) aka X-ray Photoelectron Spectroscopy (XPS) was performed on an Ulvac-PHI Quantera SXM spectrometer using a monochromatic Al X-ray source (100 μm, 100 W, 17.5 kV). For the analysis, the sample surface (~1350 μm×200 μm) was first examined by a broad survey scan to determine what elements are present on the surface. High resolution detail spectral acquisition using 55 eV pass energy with a 0.2 eV step size was acquired to determine the chemical states of the detected elements and their atomic concentrations. Typically carbon, oxygen, and fluorine were analyzed at 45° exit angle (~70 Å escape depth for carbon electrons). PHI MultiPak software was used for data analysis.

EXAMPLES

The chemicals and reagents were used as received in the Examples as follows:

From Sigma-Aldrich, Milwaukee, Wis.:

dimethyl terephthalate

Tyzor® TPT tetra-n-propoxide potassium t-butoxide dimethyl formamide dichloromethane tetrachloromethane (carbon tetrachloride)

tetrabromomethane (carbon tetrabromide)

hydrochloric acid (HCl)

anhydrous sodium sulfate 1,4-dimethyl-2-hydroxy terephthalate

From DuPont Tate & Lyle, Loudon, Tenn.:

1,3-propane diol

From SynQuest Labs., Alachua, Fla.:

heptafluoropropyltrifluorovinylether

Preparation of dimethyl 2-(1,1,2-trifluoro-2-(1,1,2,3,3,3-hexafluoro-2-(perfluoropropoxy)propoxy)ethoxy)terephthalate In a dry box, 1,4-dimethyl-2-hydroxy terephthalate (30.25 g, 0.144 mol) was added to an oven dried multiple neck 500 mL reaction flask equipped with a stirring bar and a pressure equaling (PE) addition funnel. Tetrahydrofuran (THF, 288 mL) was then added forming a mixture. The mixture was stirred until a homogeneous solution resulted. Potassium t-butoxide (4.435 g, 0.040 mol) was added, resulting in a heterogeneous mixture. Via the PE funnel, 1,1,1,2,2,3,3-heptafluoro-3-(1,1,1,2,3,3-hexafluoro-3-(1,2,2trifluorovinyloxy)propan-2-yloxy)propane (155.52 g, 0.36 mol) was added resulting in a reaction mixture. The reaction mixture was allowed to stir at room temperature (approximately 25° C.) for ~40 hours. The reaction mixture was quenched by the addition of 5 mL of 10% HCl. A material was formed from the reaction mixture. The material in the reaction flask was concentrated at reduced pressure. The material was then dissolved in dichloromethane (~300 mL) and then washed with 10% HCl (2×75 mL) and then with water (~75 mL), yielding an organic and an aqueous phase. The separated organic phase was then dried over anhydrous sodium sulfate. The sodium sulfate was then filtered off and the resulting material concentrated at reduced pressure and then fractionally vacuum distilled. The fractions boiling between 134-136° C. at 1.4-1.1 torr (84.55 g, 91.4% yield) and 136-138 at 1.1 torr (3.35 g) (combined yield: 95.04%) were collected. NMRs (nuclear magnetic resonance) of these samples were shown to be dimethyl 2-(1,1,2-trifluoro-2-(1,1,2,3,3,3-hexafluoro-2-(perfluoropropoxy)propoxy)ethoxy)terephthalate.

Preparation of dimethyl 5-(1,1,2-trifluoro-2-(1,1,2,3,3,3-hexafluoro-2-(perfluoropropoxy)propoxy)ethoxy)isophthalate In a dry box, tetrahydrofuran (THF, 1000 mL) and dimethyl 5-hydroxyisophthalate (42.00 g, 0.20 mol) were added to an oven dry round bottom reaction flask equipped with a stirrer and an addition funnel; then potassium t-butoxide (6.16 g, 0.055 mol) was added. 1,1,1,2,2,3,3-Heptafluoro-3-(1,1,1,2,3,3-hexafluoro-3-(1,2,2trifluorovinyloxy)propan-2-yloxy)propane (216 g, 0.50 mol) was then added via the addition funnel forming a reaction. The reaction was allowed to stir at room temperature. After 24 hours the reaction was terminated via the addition of 80 mL of 10% HCl. The reaction was concentrated at reduced pressure, diluted with dichloromethane, washed with 10% HCl (2×100 mL) and then with water (2×100 mL) forming an organic phase and a crude product. The organic phase was dried over anhydrous sodium sulfate and concentrated at reduced pressure. The crude product was purified by column chromatography to give 86.07 g (67.32%) yield of dimethyl 5-(1,1,2-trifluoro-2-(1,1,2,3,3,3-hexafluoro-2-(perfluoropropoxy)propoxy)ethoxy)isophthalate.

Example 1

Figure 5:
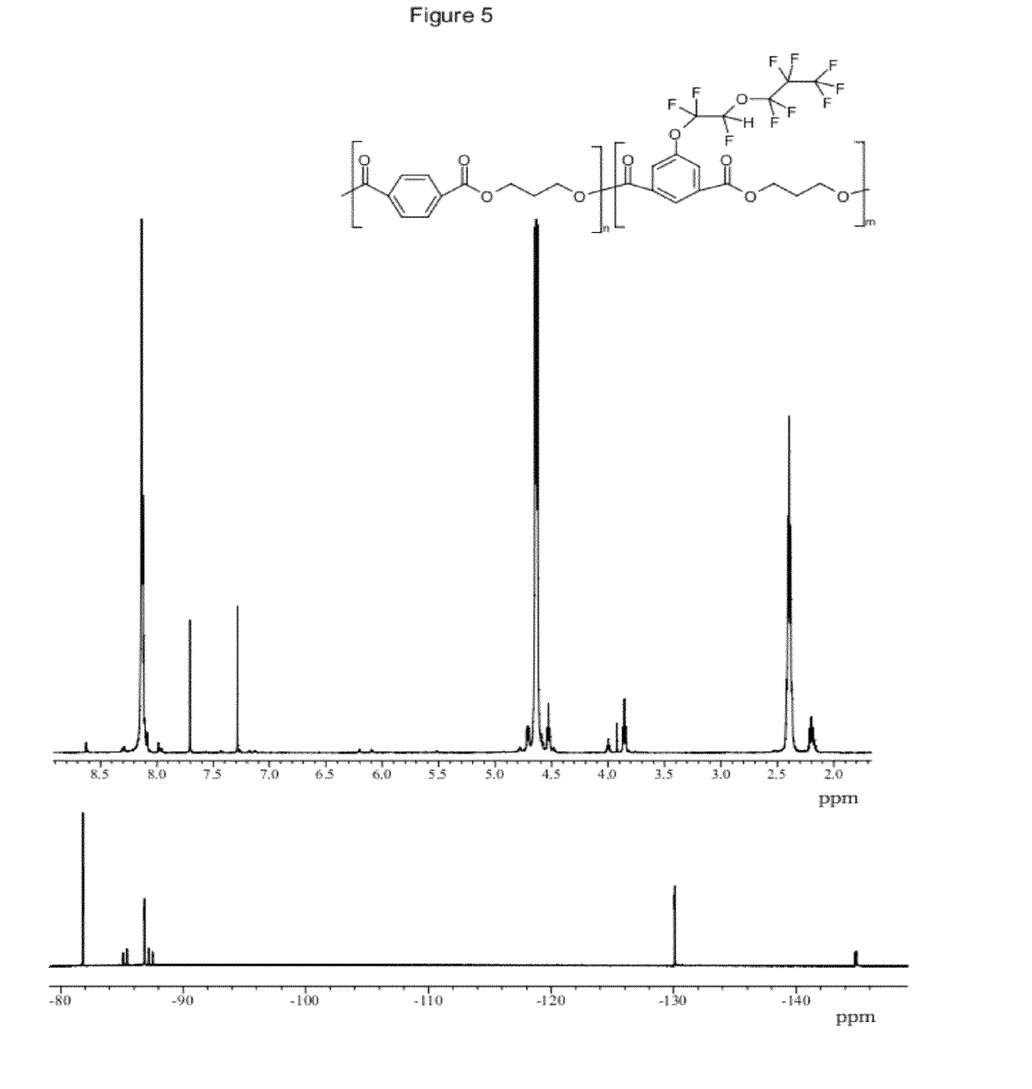
FIG. 5 is a representation of a $^1$H-NMR and a $^{19}$F-NMR scan of a copolymer of 1,3-propanediol with dimethyl 5-(1,1,2-trifluoro-2-(1,1,2,3,3,3-hexafluoro-2-perfluoropropoxy) propoxy)ethoxy)isophthalate, and dimethyl terephthalate.

Copolymerization of 1,3-propanediol with dimethyl 5-(1,1,2-trifluoro-2-(1,1,2,3,3,3-hexafluoro-2-perfluoropropoxy)propoxy)ethoxy)isophthalate, and dimethyl terephthalate Dimethylterephthalate (DMT, 130 g, 0.66 mol), dimethyl 5-(1,1,2-trifluoro-2-(1,1,2,3,3,3-hexafluoro-2-perfluoropropoxy)propoxy)ethoxy)isophthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached to the reaction flask. The reactants in the reaction flask were stirred at a speed of 50 rounds per minute (rpm) and the resulting reaction mixture was kept under nitrogen$_{(g)}$ (N$_2$) purge atmosphere, and the condenser was kept at 23° C. The contents of the reaction flask were degassed three times by evacuating the reaction flask down to 100 Torr and refilling back with N$_2$ gas. Tyzor® TPT catalyst [50 ppm Ti to theoretical polymer yield, $\delta_{TYZOR}$=0.96 g/mL] was added after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction flask was increased to 210° C. and maintained at that temperature for 90 minutes to distill off most of the formed methanol into a distillation flask. The temperature of the reaction flask was increased to 250° C. after which the nitrogen purge was closed and a vacuum ramp started, and after about 60 minutes the vacuum reached a value of 50-60 mTorr. As the vacuum stabilized the stirring speed of the stirrer was increased to 225 rpm and the reaction held for a maximum of 3-4 hours. The torque of the stirrer was monitored (readings at 180 rpm) and the reaction was typically stopped when a torque value of ~100N/cm$^2$ was reached. The polymerization was stopped by removing the heat source. The over head stirrer was stopped and elevated from the floor of the reaction flask before the vacuum was turned off and the system purged with N$_2$ gas. The formed product in the reaction flask was allowed to cool to ambient temperature and the reaction vessel was removed and the product recovered after carefully breaking the glass with a hammer. The isolated polymer product containing a copolymer of 1,3-propanediol with dimethyl 5-(1,1,2-trifluoro-2-(1,1,2,3,3,3-hexafluoro-2-perfluoropropoxy)propoxy)ethoxy)isophthalate and dimethyl terephthalate was cryo-ground (using liquid nitrogen) to an off-white powder using a Wiley mill. Overall yield ~80-90%. $^1$H-NMR (CDCl$_3$/TFA-d, 700 MHz): δ 8.60 (ArH, s, backbone), 8.25-7.90 (ArH—, m, backbone), 7.65 (ArH̄, s, cyclic dimer), 6.10 (—CF̄$_2$—CFH—O—, d, side chain), 4.75-4.45 (COO—CH$_2$—, m, backbone), 3.95 (HO—C H$_2$—R, t, end group), 3.82 (—CH$_2$—O—CH$_2$—, t, backbone DPG), 2.45-2.05 (—CH$_2$—, m, backbone). An example of a F$^{19}$—NMR is shown in FIG. 5.

Figure 1B:
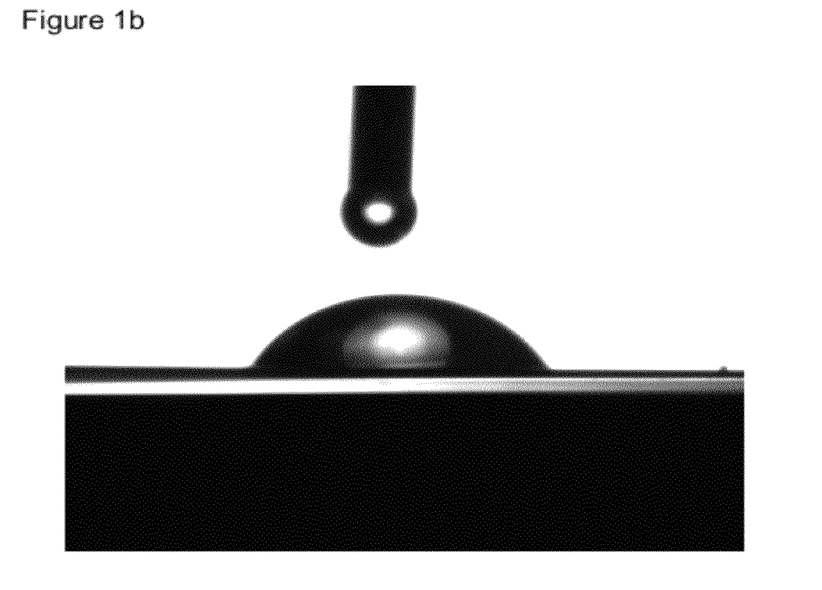
FIG. 1b is a photographic representation of a bead of water on the surface of a poly(trimethylene)terephthalate homopolymer.
Figure 2B:
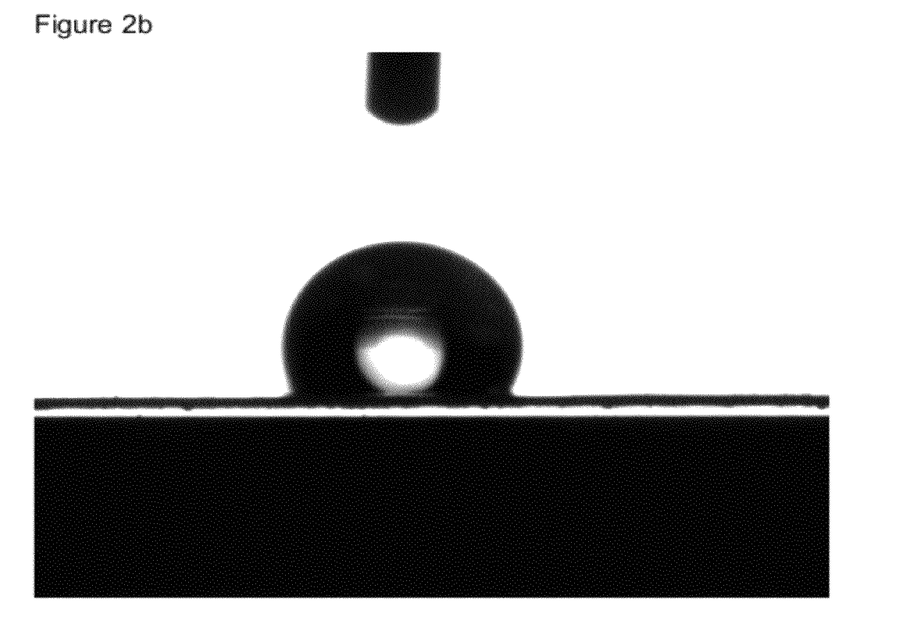
FIG. 2b is a photographic representation of a bead of water on the surface of a copolymer of poly(trimethylene)terephthalate and a perfluorinated monomer.

When pressed into a film, the neat poly(trimethylene) terephthalate completely wet a droplet of hexadecane (C$_{16}$-lipid) and also possessed a water contact angle of around 60°. Film made from the polyester comprising one or more perfluorinated monomer, e.g., F$_{16}$-iso-perfluoroether-poly(trimethylene)terephthalate-based copolymer (10 wt % load to dimethyl terephthalate, with an overall fluorinated monomer content of 2.9 mol %) possessed a hexadecane contact angle exceeding 60°, and a water contact angle exceeding 110°, as shown in FIGS. 1 and 2.

The ESCA/XPS data appear in Table 1 below.

TABLE 1

|  | F (atom %) | C (atom %) | O (atom %) |
| --- | --- | --- | --- |
| Example |  |  |  |
| Poly(trimethylene terephthalate) (comparative) | / | 73.3 | 26.7 |
| Example 1 Fluorinated copolymer | 13 | 63 | 23 |

Example 2

Copolymerization of 1,3-propanediol with dimethyl 2-(1,1,2-trifluoro-2-(1,1,2,3,3,3-hexafluoro-2-perfluoropropoxy)propoxy)ethoxy)terephthalate, and dimethyl terephthalate Dimethylterephthalate (DMT, 130 g, 0.66 mol), dimethyl 2-(1,1,2-trifluoro-2-(1,1,2,3,3,3-hexafluoro-2-perfluoropropoxy)propoxy)ethoxy) terephthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached to the reaction flask. The reactants in the reaction flask were stirred at a speed of 50 rounds per minute (rpm) and the resulting reaction mass in the reaction flask was kept under nitrogen$_{(g)}$ (N$_2$) purge atmosphere, and the condenser was kept at 23° C. The contents of the reaction flask were degassed three times by evacuating the flask down to 100 Torr and refilling back with N$_2$ gas. Tyzor®TPT catalyst [50 ppm Ti to theoretical polymer yield, $\delta_{TYZOR}$=0.96 g/mL] was added after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction flask was increased to 210° C. and maintained at that temperature for 90 minutes to distill off most of the formed methanol into a distillation flask. The temperature of the reaction flask was increased to 250° C. after which the nitrogen purge was closed and a vacuum ramp started, and after about 60 minutes the vacuum reached a value of 50-60 mTorr. As the vacuum stabilized the stirring speed was increased to 225 rpm and the reaction was held for a maximum of 3-4 hours. The torque of the stirrer was monitored (readings at 180 rpm) and the reaction was typically stopped when a torque value of ~100N/cm² was reached. The polymerization was stopped by removing the heat source. The over head stirrer was stopped and elevated from the floor of the reaction vessel before the vacuum was turned off and the system purged with $N_2$ gas. The formed product in the reaction flask was allowed to cool to ambient temperature and the reaction flask was removed and the product recovered after carefully breaking the glass with a hammer. The isolated polymer product containing a copolymer of 1,3-propanediol with dimethyl 2-(1,1,2-trifluoro-2-(1,1,2,3,3,3-hexafluoro-2-perfluoropropoxy)propoxy)ethoxy)terephthalate and dimethyl terephthalate was cryo-ground (using liquid nitrogen) to an off-white powder using a Wiley mill. Overall yield ~80-90%. $^1$H-NMR (CDCl$_3$/TFA-d, 700 MHz): δ 8.25-7.90 (Ar H—, m, backbone), 7.65 (ArH, s, cyclic dimer), 6.18 (—CF$_2$—CFH—O—, d, side chain), 4.75-4.45 (COO—CH$_2$—, m, backbone), 3.97 (HO—CH$_2$—R, t-broad, end group), 3.82 (—CH$_2$—O—CH$_2$—, t, backbone DPG), 2.45-2.05 (—CH$_2$—, m, backbone).

When pressed into a film, the material (10 wt % load to dimethyl terephthalate) exhibited contact angles of ~50° and ~109° when a drop of hexane and water were placed on it, respectively, as shown in FIGS. 3a and 3b.

The ESCA/XPS data appear in Table 2 below.

TABLE 2

| Example | F (atom %) | C (atom %) | O (atom %) |
|---|---|---|---|
| Poly(trimethylene terephthalate) (comparative) | / | 73.3 | 26.7 |
| Example 2 Fluorinated copolymer | 12 | 63 | 24 |

Example 3

Copolymerization of 1,3-propanediol with dimethyl 5-(1,1,2-trifluoro-2-(perfluoropropoxy)ethoxy)isophthalate, and dimethyl terephthalate Dimethylterephthalate (DMT, 130 g, 0.66 mol), dimethyl 5-(1,1,2-trifluoro-2-(perfluoropropoxy)ethoxy)isophthalate (weight percent relative DMT), and 1,3-propanediol (90.4 g, 1.19 mol, 1.8 eq to DMT) were charged to a pre-dried 500 mL three necked round bottom reaction flask. An overhead stirrer and a distillation condenser were attached to the reaction flask. The reactants formed a reaction mixture and were stirred in the reaction flask at a speed of 50 rounds per minute (rpm) and the reaction mixture was kept under nitrogen$_{(g)}$ ($N_2$) purge atmosphere, and the condenser was kept at 23° C. The contents of the reaction flask were degassed three times by evacuating the reaction flask down to 100 Torr and refilling back with $N_2$ gas. Tyzor®TPT catalyst [50 ppm Ti to theoretical polymer yield, $δ_{TYZOR}$=0.96 g/mL] was added to the reaction flask after the first evacuation. The reaction flask was immersed into a preheated metal bath set at 160° C. The solids in the reaction flask were allowed to completely melt at 160° C. for 20 minutes after which the stirring speed was slowly increased to 180 rpm. The temperature of the reaction flask was increased to 210° C. and maintained for 90 minutes to distill off most of the formed methanol into a distillation flask. The temperature of the reaction flask was increased to 250° C. after which the nitrogen purge was closed and a vacuum ramp started, after about 60 minutes the vacuum reached a value of 50-60 mTorr. As the vacuum stabilized the stirring speed was increased to 225 rpm and the reaction was held for a maximum of 3-4 hours. The torque of the stirrer was monitored (readings at 180 rpm) and the reaction was typically stopped when a torque value of ~100N/cm² was reached. The polymerization was stopped by removing the heat source. The over head stirrer was stopped and elevated from the floor of the reaction flask before the vacuum was turned off and the system purged with $N_2$ gas. The formed product in the reaction flask was allowed to cool to ambient temperature and the reaction flask was removed and the product recovered after carefully breaking the glass with a hammer. The isolated polymer product containing a copolymer of 1,3-propanediol with dimethyl 5-(1,1,2-trifluoro-2-(perfluoropropoxy)ethoxy)isophthalate, and dimethyl terephthalate was cryo-ground (using liquid nitrogen) to an off-white powder using a Wiley mill. Overall yield ~80-90%. $^1$H-NMR (CDCl$_3$/TFA-d, 700 MHz): δ 8.60 (ArH, s, backbone), 8.25-7.90 (ArH—, m, backbone), 7.65 (ArH, s, cyclic dimer), 6.10 (—CF$_2$—CFH—O—, d, side chain), 4.75-4.45 (COO—CH$_2$—, m, backbone), 3.95 (HO—CH$_2$—R, t, end group), 3.82 (—CH$_2$—O—CH$_2$—, t, backbone DPG), 2.45-2.05 (—CH$_2$—, m, backbone).

When pressed into a film, the material (10 wt % load to dimethyl terephthalate) exhibited contact angles of ~35° and ~93° when a drop of hexane and water were placed on it, respectively, as shown in FIGS. 4a and 4b.

The ESCA/XPS data appear in Table 3 below.

TABLE 3

| Example | F (atom %) | C (atom %) | O (atom %) |
|---|---|---|---|
| Poly(trimethylene terephthalate) (comparative) | / | 73.3 | 26.7 |
| Example 3 Fluorinated copolymer | 9.1 | 67 | 24 |

What is claimed is:

1. A film formed from a copolyester comprising a perfluorinated monomer, wherein the amount of the perfluorinated monomer is 10 wt % of the copolyester, wherein the film exhibits a hexane contact angle exceeding 60 degrees, and a water contact angle exceeding 110 degrees, wherein the copolyester is represented by formula (I), (II), or (III)

wherein, for (I) and (II),
  each R is independently H, $C_1$-$C_{10}$ alkyl, $C_5$-$C_{15}$ aryl, or $C_6$-$C_{20}$ arylalkyl;
  each Rx is Hydrogen;
  each X is independently O or $CF_2$;
  each Y is independently O or $CF_2$;
  each Z is independently H, Cl or Br;
  each $Rf^1$ is independently $(CF_2)_n$, wherein each n is independently 0-10;
  each $Rf^2$ is independently $(CF_2)_p$, wherein each p is independently 0-10,
    with the proviso that when p is 0, Y is $CF_2$;
  each q is independently 0-10;
  m is 1-10,000; and
  w is 1-10,000;
and wherein, for (III),
  each R is independently H, $C_1$-$C_{10}$ alkyl, $C_5$-$C_{15}$ aryl, or $C_6$-$C_{20}$ arylalkyl;
  each Rx is Hydrogen;
  each X is independently O or $CF_2$;
  each Y is independently O or $CF_2$;
  each Z is independently H, Cl or Br, with the proviso that only one Z can be H; and
  each $Rf^1$ is independently $(CF_2)_n$, wherein each n is independently 0-10 each
  $Rf^2$ is independently $(CF_2)_p$, wherein each p is independently 0-10,
    with the proviso that when p is 0, Y is $CF_2$;
  each q is independently 0-10;
  m is 1-10,000; and
  w is 1-10,000.

* * * * *